Figure 1:
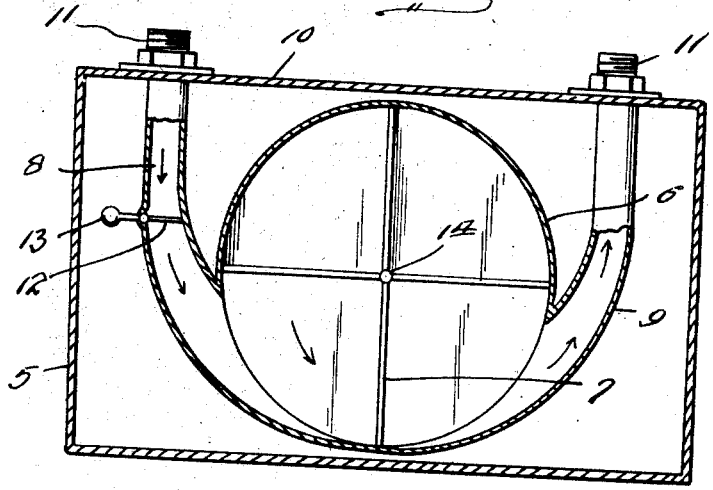

Aug. 24, 1926.

H. J. WILKINSON 1,597,334

GAS METER

Original Filed August 10, 1923

Witnesses:

H. J. Wilkinson,
Inventor

By
Attorney

Patented Aug. 24, 1926.

1,597,334

UNITED STATES PATENT OFFICE.

HARRY J. WILKINSON, OF ROCHESTER, NEW YORK.

GAS METER.

Application filed August 10, 1923, Serial No. 656,673. Renewed February 12, 1926.

This invention relates to certain new and useful improvements in gas meters, and the primary object of the invention is to provide a device of this kind which embraces the desired qualities of simplicity and durability in construction, as well as efficiency in operation.

With the above general object in view and others that will become apparent as the nature of the invention is better understood, the same consists in the novel form, combination, and arrangement of parts hereinafter more fully described, shown in the accompanying drawings, and claimed.

Figure 2:
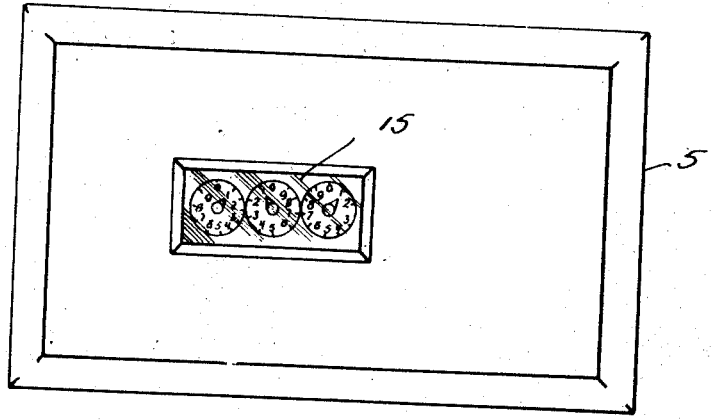

In the drawings, wherein like reference characters indicate like parts in the several views:

Figure 1 is a vertical longitudinal sectional view of a gas meter constructed in accordance with the present invention, and Figure 2 is a side elevational view of the device shown in Figure 1.

Referring more in detail to the drawings, the invention embodies a suitable casing 5 which may be of rectangular form, and arranged within this casing is a cylindrical subcasing 6 within which is suitably journalled a bladed impeller 7, the opposite sides of the casing 6 being respectively provided with inlet conduits or pipes 8 and 9. The inlet and outlet pipes 8 and 9, are preferably curved upwardly to extend through the top wall 10 of the casing 5 where they are provided with means as at 11 for convenient connection to the supply and consumption line, (not shown). In the inlet pipe 8, I have provided a check valve of the weight and flapper type, i. e., the valve is held closed by a counter weight 13, in case the meter should be reversed, the valve 12 acting to prevent the flow of gas while freely permitting said flow in the proper direction.

It will be seen that when the meter is properly installed, the gas will flow in the direction indicated by the arrows in Figure 1, so as to pass thru the lower part of the circular casing or drum 6 and turn the impeller 7 which is of the four bladed type, as shown. The impeller 7 is provided with a shaft 14 which is adapted to be geared to a conventional form of register, indicated generally at 15, in Figure 2, in any preferred or well known manner. An example of this gearing is apparent if we consider that one revolution of the impeller allows one cubic foot of gas to pass through the meter, the gear ratio then being for a 1000 cubic foot register 1000 to 1. From the drum, the gases passes out of the outlet pipe 9 to the burners or other point of consumption.

While I have shown the inlet and outlet pipes 8 and 9 as passing through the top wall 10 of the casing 5, they could be passed through the ends of the casing for ease of construction. The advantage of the arrangement of inlet and outlet pipes shown is that the device is particularly adapted to be installed without considerable labor in place of meters now in common use.

From the foregoing description it will be seen that I have provided a simple form of meter in which the impeller is rotated anti-clockwise during the operation of the meter, which may be cheaply and easily constructed and installed and which embodies means for preventing reverse installation of the meter which would result in rendering the register 15 inoperative.

Minor changes may be made without departing from the spirit and scope of the invention as claimed.

What I claim as new is:

A gas meter comprising a cylindrical casing, a shaft journalled in the casing and having its axis coincident with the axis of the casing, radially disposed blades carried by the shaft and bridging the space between the shaft and the inner cylindrical surface of the casing, gas inlet and outlet conduits disposed one at each side of the cylindrical casing, said conduits being of the same configuration and the same relative dimensions, a check valve located in the inlet conduit, the passageways through the conduits gradually increasing in transverse sectional area, from their outer ends toward the ends thereof, which communicate with the casing, the outer walls of both conduits being in arcuate alignment with each other and having their inner surfaces disposed tangentially, with relation to the blades whereby the blades may successively bridge the space between the shaft and the inner surfaces of the outer walls of both conduits.

In testimony whereof I affix my signature.

HARRY J. WILKINSON.